United States Patent
Ratnakar

(10) Patent No.: US 9,531,665 B2
(45) Date of Patent: *Dec. 27, 2016

(54) INFORMATION MESSAGING SYSTEM

(71) Applicant: Nitesh Ratnakar, Wheeling, WV (US)

(72) Inventor: Nitesh Ratnakar, Wheeling, WV (US)

(*) Notice: Subject to any disclaimer, the term of this patent is extended or adjusted under 35 U.S.C. 154(b) by 0 days.

This patent is subject to a terminal disclaimer.

(21) Appl. No.: 14/618,541

(22) Filed: Feb. 10, 2015

(65) Prior Publication Data

US 2015/0156163 A1 Jun. 4, 2015

Related U.S. Application Data

(63) Continuation of application No. 13/274,303, filed on Oct. 15, 2011, now Pat. No. 8,971,858.

(51) Int. Cl.
| | |
|---|---|
| *H04M 3/42* | (2006.01) |
| *H04L 29/12* | (2006.01) |
| *G06Q 30/06* | (2012.01) |
| *H04M 1/2745* | (2006.01) |
| *H04M 3/493* | (2006.01) |
| *H04W 8/18* | (2009.01) |

(52) U.S. Cl.
CPC ....... *H04L 61/1594* (2013.01); *G06Q 30/0631* (2013.01); *H04M 1/274516* (2013.01); *H04M 1/274508* (2013.01); *H04M 3/4931* (2013.01); *H04M 2203/253* (2013.01); *H04W 8/18* (2013.01)

(58) Field of Classification Search
CPC ...................................................... H04M 3/42
USPC ...................................................... 455/414.1
See application file for complete search history.

(56) References Cited

U.S. PATENT DOCUMENTS

2006/0178903 A1* 8/2006 Cruz-Rivera .......... G06Q 30/02
705/1.1

* cited by examiner

*Primary Examiner* — Michael T Vu
(74) *Attorney, Agent, or Firm* — Jundong Ma

(57) ABSTRACT

A method of transmitting contact information to an approved mobile communication device includes receiving an input representative of desired contact information located on a first web page and an input representative of the identity of a desired mobile communication device. The method also includes saving information representative of the desired contact information in a contact information database. The method also includes determining whether the desired mobile communication device is an approved device and transmitting to the desired mobile communication device information representative of a notification to send the information representative of the desired contact information. The method also includes receiving an input from the desired mobile communication device information representative of an acceptance to receive the information representative of the desired contact information, and transmitting to the desired mobile communication device information representative of the desired contact information.

12 Claims, 11 Drawing Sheets

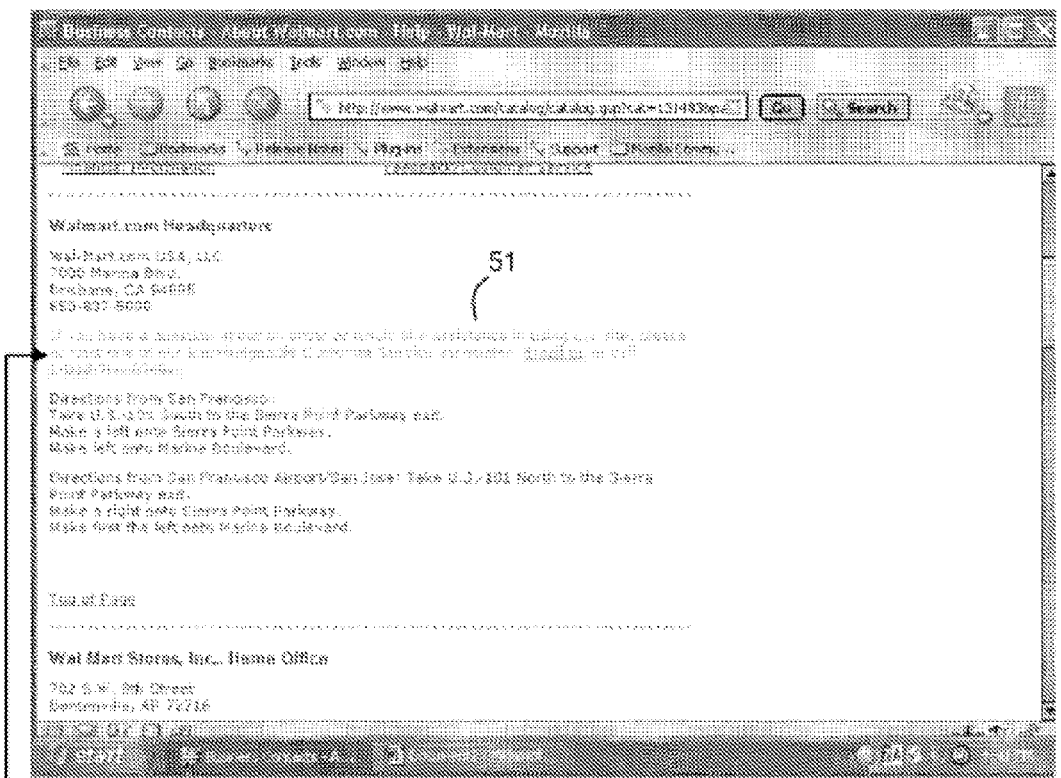
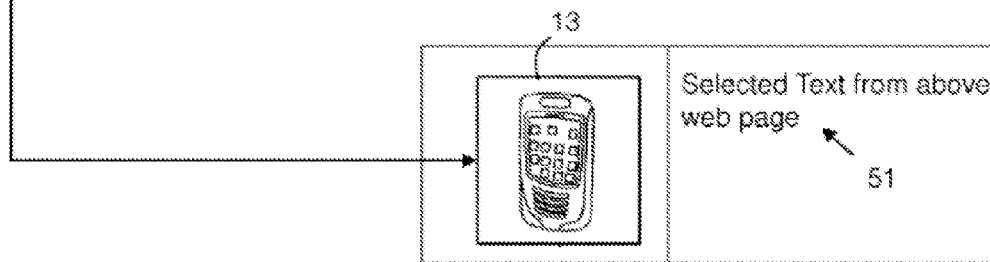
FIG. 5

| Mobile Phone Number | Mobile Phone UID | Pending Request 1 | Pending Request 2 | Pending Request 3 |
|---|---|---|---|---|
| | | | | |
| | | | | |

FIG. 8A

| Mobile Phone Number | Mobile Phone UID | Mobile Phone Application Downloaded | Mobile Phone Application Version | Date & Time |
|---|---|---|---|---|
| | | | | |
| | | | | |

FIG. 8B

| User Account ID | Contact Info's sent | Mobile Phone Number | Mobile Phone UID | Date & Time |
|---|---|---|---|---|
| | | | | |
| | | | | |

FIG. 8C

| User Account ID | Contact Info's Retrieved | Mobile Phone Number | Mobile Phone UID | Date & Time |
|---|---|---|---|---|
| | | | | |
| | | | | |

FIG. 8D

| User Account ID | Username | Password | Demographics | Contact Info |
|---|---|---|---|---|
| | | | | |
| | | | | |

FIG. 8E

| User Account ID | Contact Info's Activated | Mobile Phone Number | Mobile Phone UID | Date & Time |
|---|---|---|---|---|
| | | | | |
| | | | | |

FIG. 8F

| User Account ID | Web Links Activated | Mobile Phone Number | Mobile Phone UID | Date & Time |
|---|---|---|---|---|
| | | | | |
| | | | | |

FIG. 8G

INFORMATION MESSAGING SYSTEM

CROSS-REFERENCE TO RELATED APPLICATION

This application is a continuation application claiming priority under 35 U.S.C. §120 to U.S. Non-provisional patent application Ser. No. 13/274,303, filed on Oct. 15, 2011, which is a continuation-in-part application claiming priority under 35 U.S.C. §120 to each and all of the following U.S. patent applications:

a) U.S. Non-provisional patent application Ser. No. 11/164,318, filed on Nov. 17, 2005, now U.S. Pat. No. 8,254,893;
b) U.S. Non-provisional patent application Ser. No. 11/306,336, filed on Nov. 23, 2005, now U.S. Pat. No. 7,533,343;
c) U.S. Non-provisional patent application Ser. No. 11/308,900, filed on May 24, 2006, now U.S. Pat. No. 7,593,721, which is a continuation-in-part application claiming priority under 35 U.S.C. §120 to the aforesaid U.S. Non-provisional patent application Ser. No. 11/164,318;
d) U.S. Non-provisional patent application Ser. No. 11/966,020, filed on Dec. 28, 2007, now U.S. Pat. No. 8,180,329;
e) U.S. Non-provisional patent application Ser. No. 12/046,358, filed on Mar. 11, 2008, now pending;
f) U.S. Non-provisional patent application Ser. No. 12/049,326, filed on Mar. 15, 2008, now U.S. Pat. No. 8,848,892;
g) U.S. Non-provisional patent application Ser. No. 12/122,705, filed on May 18, 2008, now pending;
h) U.S. Non-provisional patent application Ser. No. 12/140,684, filed on Jun. 17, 2008, now pending;
i) U.S. Non-provisional patent application Ser. No. 12/464,097, filed on May 11, 2009, now pending, which is a continuation-in-part application claiming priority under 35 U.S.C. §120 to the aforesaid U.S. Non-provisional patent application Ser. No. 12/140,684;
j) U.S. Non-provisional patent application Ser. No. 12/508,550, filed on Jul. 23, 2009, now U.S. Pat. No. 8,331,915, which is a continuation-in-part application claiming priority under 35 U.S.C. §120 to the aforesaid U.S. Non-provisional patent application Ser. Nos. 11/164,318 and 11/308,900; and
k) U.S. Non-provisional patent application Ser. No. 12/784,978, filed on May 21, 2010, now U.S. Pat. No. 8,171,093, which is a continuation-in-part application claiming priority under 35 U.S.C. §120 to the aforesaid U.S. Non-provisional patent application Ser. Nos. 12/122,705 and 11/306,336.

All of the aforesaid prior patent applications are incorporated herein by reference in their entirety.

TECHNICAL FIELD

The disclosure relates to management of contact information; more specifically to method, system, means and apparatus for sending and saving contact information published on a web page directly to mobile communication devices.

BACKGROUND

It is a common practice for businesses to have a presence on the internet via a web site. This practice enables businesses to reach out to an ever-growing base of customers who do commerce on the internet. It is also a common practice for businesses to publish their contact information on their web pages. The published contact information usually contains business name, phone number, fax number, email and street address. This gives customers the means to contact the said businesses by multiple means including email, phone, fax, mail and in person. It is a common practice in web commerce for customers to look for a product online and then subsequently purchase the said product by another means such as by making a phone call, faxing or mailing an order form or by visiting a retail outlet in person. In order to remember the contact information of a business published on a web page, a customer has to either 1) print the web page containing the said business's contact information; 2) write it manually on a piece of paper or; 3) enter it manually into a mobile phone such as a mobile phone. This is a cumbersome and time consuming way to remember contact information; especially when a customer has to remember contact information of multiple businesses. There is no invention in the prior art that enables customers to send a contact information published on a web page directly to communication devices such as mobile phones; and thereafter integrate the said contact information into the contact list of the said mobile phone without requiring the customer to enter the said contact information manually into the communication device.

SUMMARY

The present invention relates to means, methods, system and apparatus to send contact information published on a web page to mobile communication device and automatically save the received contact information into the contact list of the mobile communication device. Additionally the invention relates to management of contact information thus saved in the contact list of mobile communication devices.

BRIEF DESCRIPTION OF THE DRAWINGS

The drawings are illustrative embodiments. The drawings are not necessarily to scale and certain features may be removed, exaggerated, moved, or partially sectioned for clearer illustration. The embodiments illustrated herein are not intended to limit or restrict the claims.

FIG. 4A also shows the display of contact information (11A) and the corresponding advertisement (40) on the mobile communication device (13).

FIG. 4B also shows the display of contact information (11A) and the corresponding advertisement (40) on the mobile communication device (13).

FIG. 5 is a schematic representation of sending information (51) published on a web page (10) to a mobile communication device (13); and thereafter saving and displaying information (51) on mobile communication device (13).

FIGS. 8A-G show schematic representations of the structure of various databases according to an embodiment.

DETAILED DESCRIPTION

Figure 1:
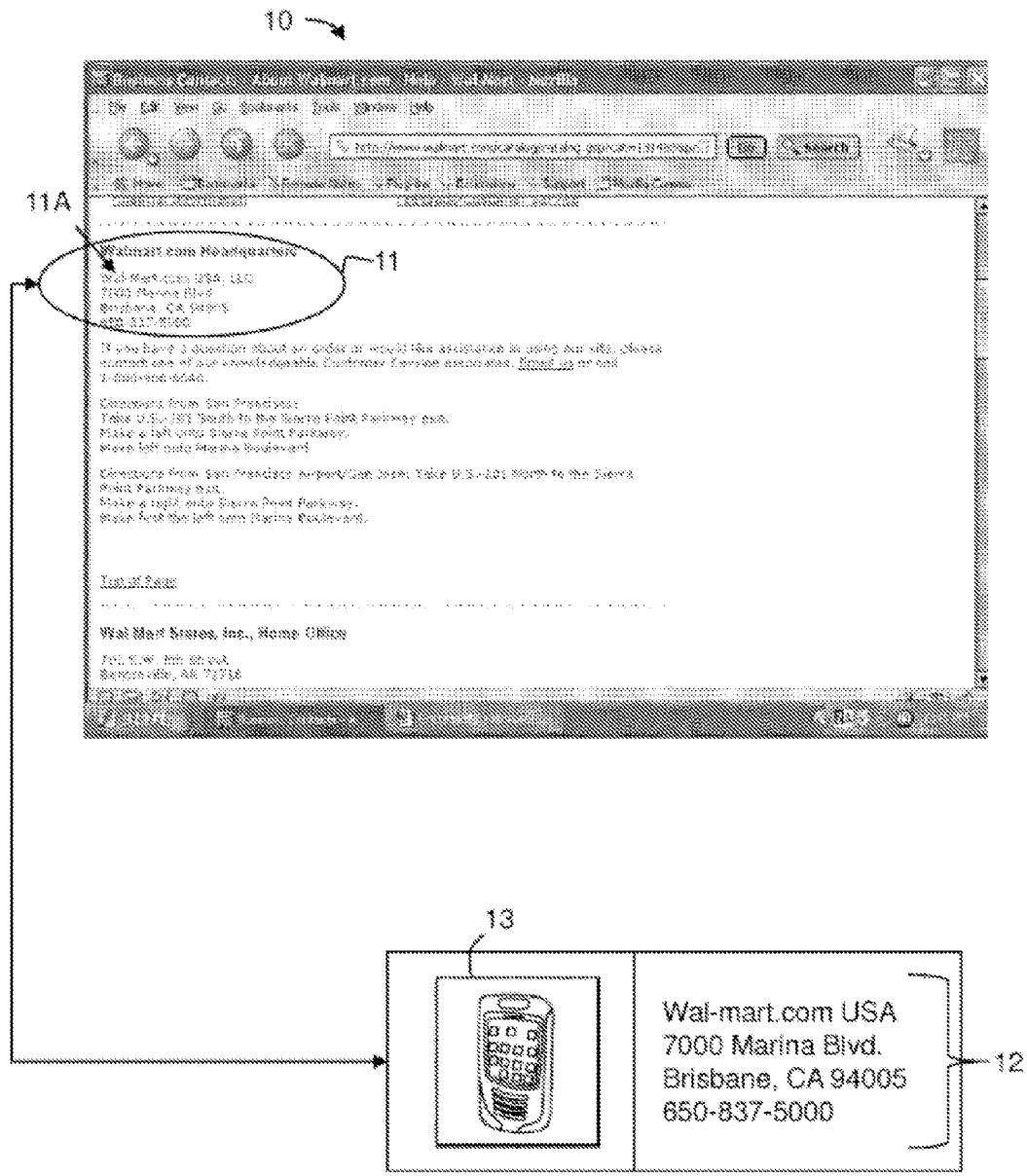
FIG. 1 shows a schematic representation of sending contact information (11A) published in a web page (10) to a mobile communication device (13); and thereafter saving the contact information into the native contact list (12) of the mobile communication device, according to an embodiment.

In this respect; before explaining at least one embodiment of the invention in detail; it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods and systems for carrying out one or several purposes of the present invention. It is important, therefore, that the claims be regarded as including such equivalent constructions insofar as they do not depart from the spirit and scope of the present invention.

It is a common practice for businesses to publish their contact information on one or more web sites. The purpose of this practice is to enable customers to easily contact them. The published contact information usually contains name, phone number, fax number, email and street address of the business. At the present time, contact information is published on a web page using free text, usually using HTML programming language. There is no standard format or template for publishing contact information; consequently each web page has its unique format and template for publishing contact information. Presently, to save contact information displayed on a web page, customer is required to manually write down the contact information on paper or print the web page containing the contact information and manually enter the contact information into mobile communication device. This is a tedious and cumbersome process and many users choose not to save contact information published on a web page into mobile communication device.

Figure 2A:
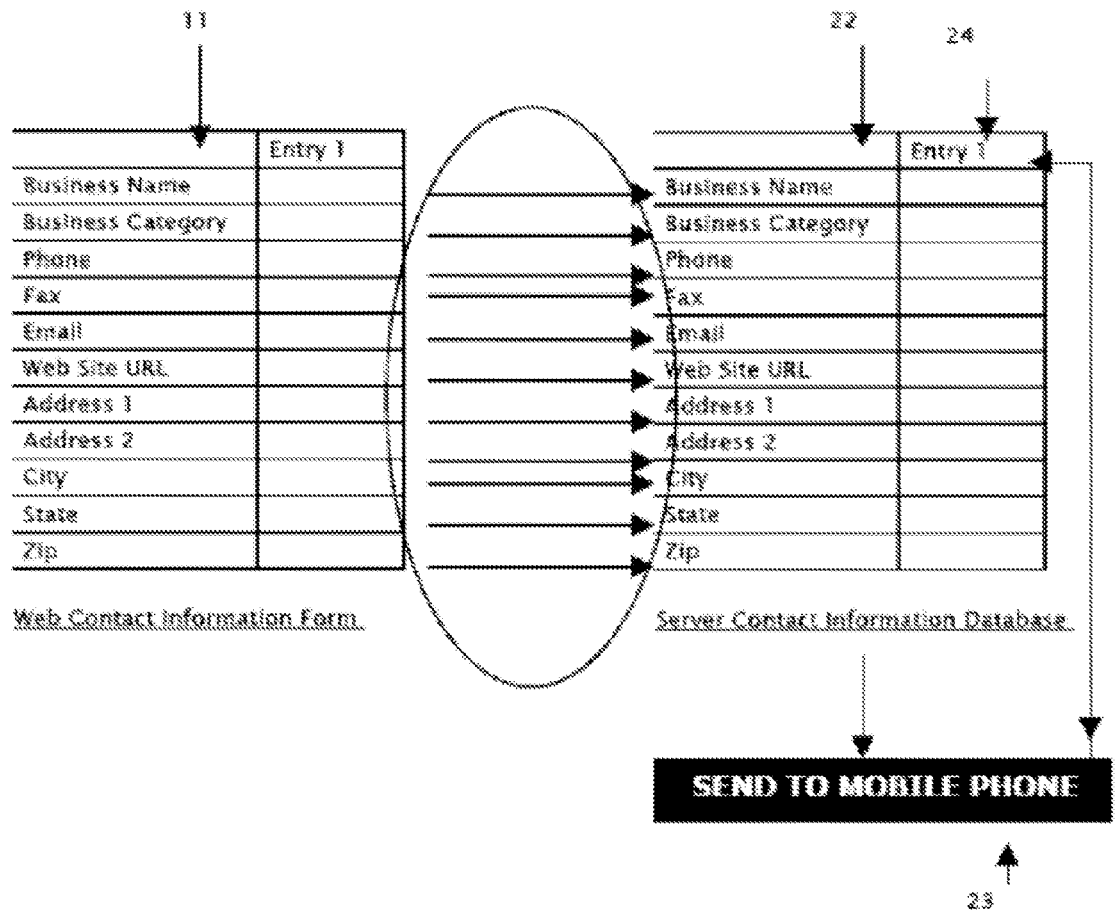
FIG. 2A shows the structure of the 'web contact information from' (11) and a schematic representation of the transfer of data entered into the 'web contact information form' (11) into corresponding data fields of the 'server contact information' database (22). It also shows the generation of a link (23) responsive to an entry in the 'server contact information' database (22); the link (23) comprising of an embedded code representative of the location of the corresponding contact information (24) in the 'server contact information' database (22).
Figure 3:
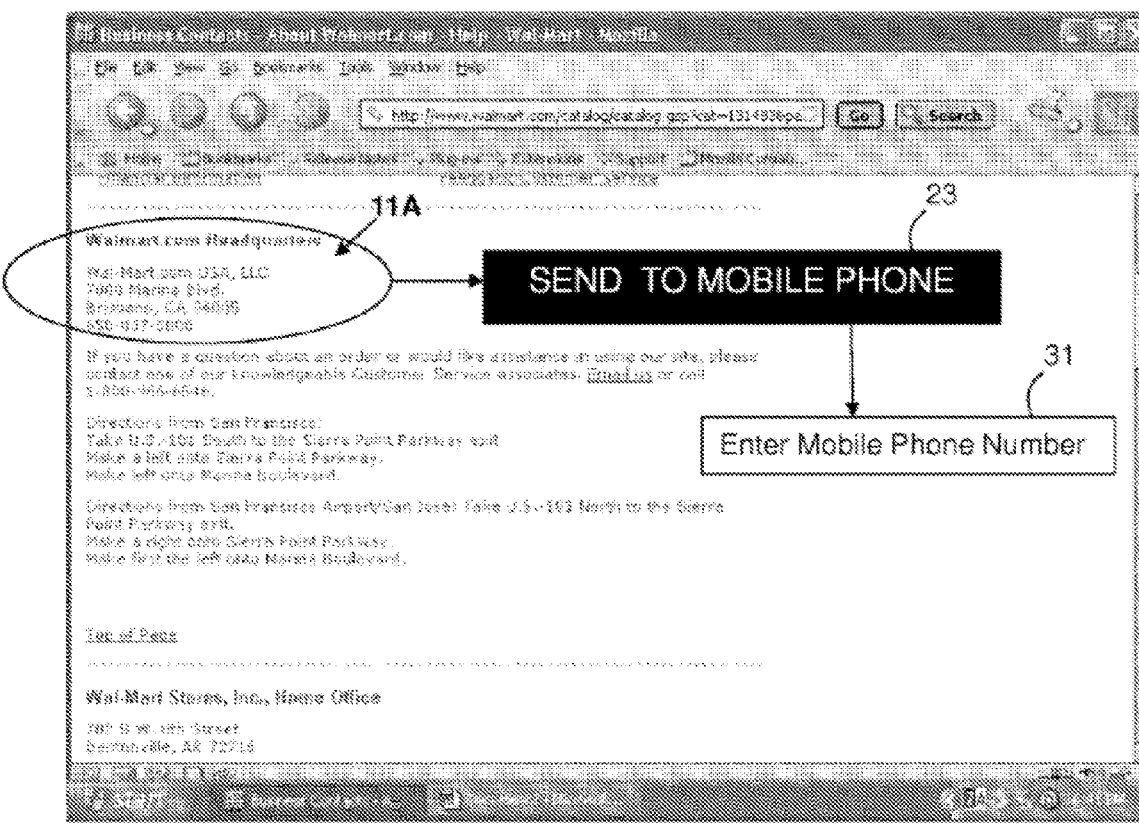
FIG. 3 shows link (23) displayed next to corresponding contact information (11A) published on web page and the command prompt (31) that is displayed upon selecting the link (23) prompting user to enter the receiving mobile communication device number (entered at the command prompt 31).

Components of an embodiment include: 1) a server application hosted on a server; 2) a mobile phone application downloadable from the server and hosted on a plurality of the mobile communication devices; 3) a contact information database in the server receiving data entered into 'web contact information' form published on a web page; and 4) a contact list hosted in each mobile communication device. When a user (example vendor) signs up for the service, a user account is created in the server 'user account' database, as shown in FIGS. 2C & 8E. The server 'user account' database may include the user name, password, user demographics (such as user age, education level, etc.) and contact information that user desires to offer for download from the web page. The user enters the contact information to be displayed on the web page into a 'web contact information form' (11) as shown in FIG. 2A. The 'web contact information form' (11) serves as a data entry portal for data contained in server contact information database (22) saved in the server; as shown in FIG. 2A. Server contact information database (22) is created using a database program like MS SQL, My SQL; or into any other suitable database program. The type of software used to create the server contact information database (22) should not be considered limiting as many software programs can be used to achieve the same end result. The 'web contact information form' (11) contains data fields for business name, business category, phone number, fax number, email, web page uniform resource locator (URL) and street address and any additional fields deemed desirable. The data fields should not be considered limiting as it can be customized according to individual needs. Means is provided to distribute the 'web contact information form' (11) over the Internet to programmers, web masters and other individuals responsible for designing and programming web pages. Contact information entered into 'web contact information form' (11) is preferably displayed on the contact information page of a web site. In the preferred embodiment, 'web contact information form' is web page specific, i.e. when a 'web contact information form' is generated it contains a web page specific code whereby the 'web contact information form' and representative contact information data can only be displayed on the corresponding web page. Once contact information data is entered into 'web contact information form' it is saved into corresponding entry in the server contact information database (22, 24) as shown in FIG. 2A. The server application generates a link (23) with embedded code representative of the location of the corresponding contact information (24) in the server contact information database (22), also shown in FIG. 2A. In the preferred method, the link (23) is displayed in close proximity to the corresponding contact information on a web page as shown in FIG. 3. When the link (23) is activated on the web page; user is prompted to enter the receiving mobile communication device number i.e. phone number (31) as shown in FIG. 3, where after the embedded code contained in the link (23) directs the user request to appropriate entry (24) in the server contact information database (22) as shown in FIG. 2A.

Figure 2B:
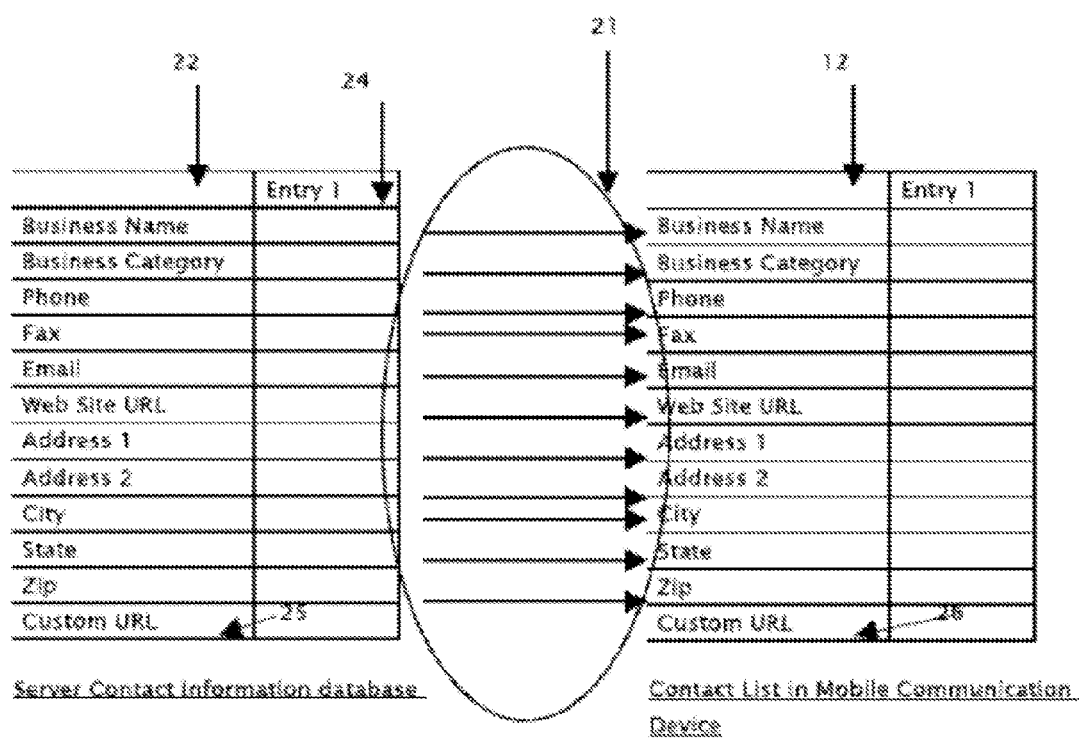
FIG. 2B shows an interface (21) contained in the 'mobile phone' application that seamlessly enters data received in mobile communication device from 'server contact information' database (22) into corresponding data fields of the contact list (12) of the mobile communication device.

As shown in FIG. 2B, once contact information (24) is entered into the server contact information database (22), the server application may generate a 'custom web URL' (25) for the contact information (24). When contact information (24) is transmitted to and saved into the contact list (12) in the mobile communication device (13), a corresponding 'custom web URL' (26) may be saved as well. In one preferred method, web page corresponding to the 'custom web URL' (25, 26) is hosted in the server. Alternatively, web page corresponding to the 'custom web URL' (25, 26) is hosted on another server. When user activates the 'custom web URL' (26) within the mobile communication device, the request is transmitted to the server. The server application contains program code to forward the 'custom web URL' (26) to corresponding web page. In the preferred embodiment the server application also contains program code to block forwarding of the 'custom web URL' (26) to corresponding web page with certain pre determined filters—such as when the corresponding web page contains unlawful content; when payment for forwarding the 'custom web URL' to corresponding web page has not been received etc. According to yet another embodiment of the invention; the mobile phone application contains program code that records instances of web link activation from within the contact list of mobile communication device. The mobile phone application may contain program code to communicate at least one of i) instances of web link activation; ii) unique mobile communication device identifier (UDID); iii) corresponding contact information ID; and iv) mobile communication device number (phone number) to the server. Further, this data may be communicated at pre determined intervals or after preselected occurrences, or at other desired instances. The server application may save all instances of web link activation data received from mobile communication devices into 'web link activation' database; as shown in FIG. 8G. This data may be used to charge user or vendor for each instance of web link activation; i.e. pay per click. One or more reports based on data contained in the 'web link activation' database in the server may be generated.

A contact list (12) is provided for mobile communication devices and is shown in FIG. 2B. The contact list (12) may be created using a software and database program suitable for the corresponding mobile phone and is usually native to the communication device. One example of such program is Java 2 Micro Edition (J2ME). Most mobile phones can run Java program with MIDP supported. (MIDP: Mobile Information Device Profile). The newer phones support MIDP2.0 while some older phones only support MIDP1.2/1.1. The type of software program used to create the contact list (12) should not considered limiting as more than one software program can be used to achieve the desired results. Means may be provided to distribute the contact list (12) to one or more mobile communication devices over the Internet, wireless network or any other network. Alternatively, the contact list (12) is pre loaded into mobile communication device at the point of manufacture wherein it forms the native contact list of the mobile communication device. An interface (21), as shown in FIG. 2B, may be provided in the mobile phone application to download, synchronize, and integrate data between the corresponding data fields of the server contact information database (22) and the contact list (12). In an exemplary method, the contact list (12) is the native contact list of the mobile communication device. Further, the data fields in the 'contact list' (12) may be identical to the data fields contained in the 'web contact information form' (11) and the server contact information database (22). As shown in FIG. 2B, the data fields in the contact list (12) consist of business name, business category, phone number, fax number, email, web page URL and street address. Also shown in FIG. 2B is an interface (21) which is a part of the mobile phone application hosted in the mobile communication device. The mobile phone application is created to enable seamless interfacing and integration of contact information data between the 'web contact information form' (11), server contact information database (22) and the contact list (12) of the mobile communication device.

FIGS. 1 and 3 show the steps involved in sending contact information published on a web page to a mobile communication device. FIG. 1 is a schematic representation of one embodiment of the present invention. Contact information (11A) is published on a web page (10). As shown in FIG. 3, the embedded link/icon (23) is pasted next to the contact information (11A) on the web page. According to the preferred method, when user selects the link/icon (23), the user is prompted to enter the receiving mobile communication device number (31) (for example, the mobile phone number or any other identifying data). Then the user may select (click) the link 23 or otherwise submit the request to download the contact information on the receiving mobile communication device. The user request is then transmitted to the server (60) application (hosted in the server) via a communication link (step 1 of FIGS. 6 and 7).

Figure 6:
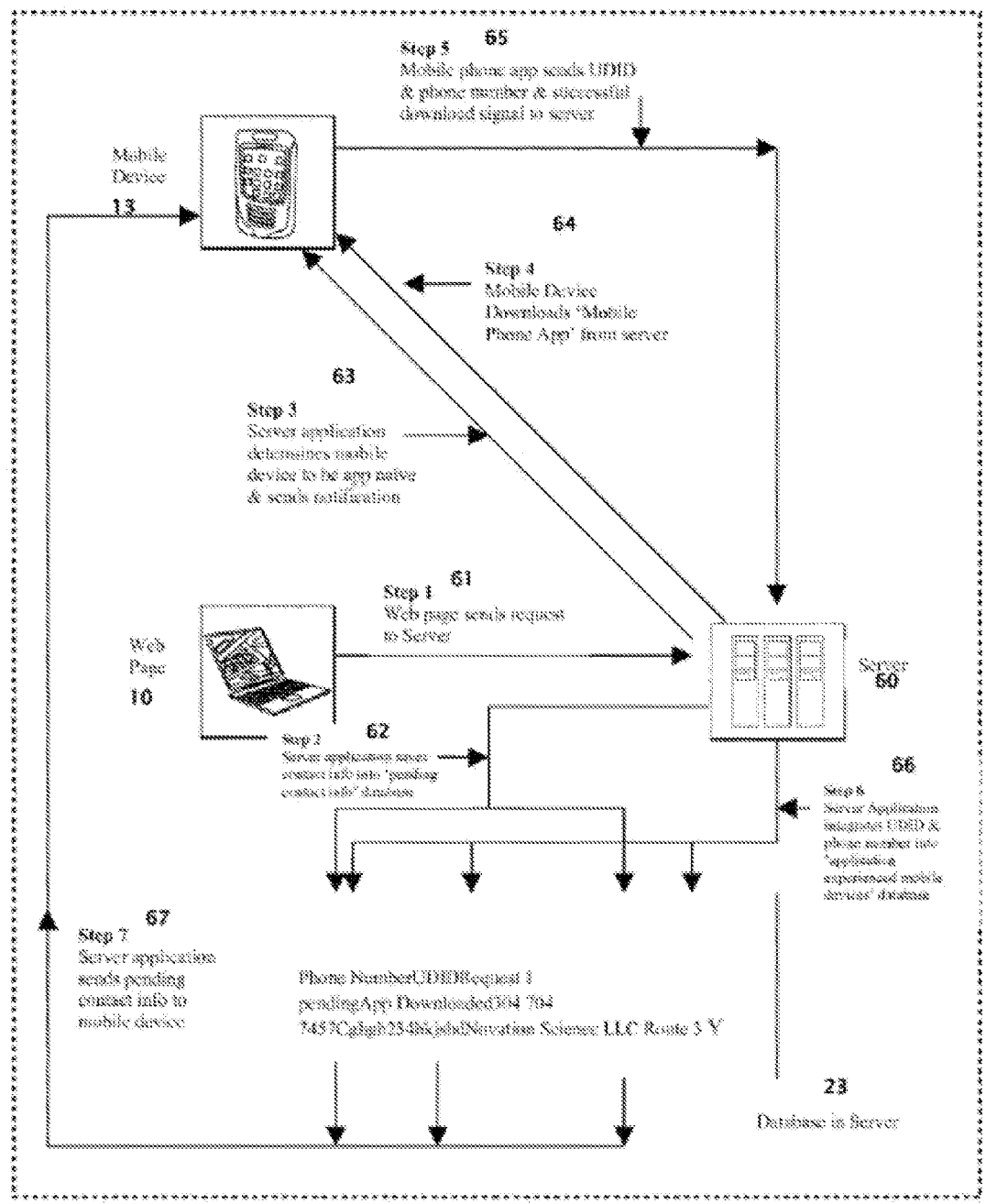
FIG. 6 shows a schematic diagram of the process of sending contact information from web page to an application naïve mobile communication device.

Turning our attention to FIG. 6, when user request from web page is received in the server (61), the server application checks the receiving mobile communication device number (such as, for example the mobile phone number) in the request against the 'application experienced mobile communication devices' database (30, FIG. 8B) containing list of mobile communication devices where the 'mobile phone' application has already been downloaded. Mobile phone application is hosted in the server and is downloadable into mobile communication devices over a communication link. Server application contains 'application experienced mobile communication devices' database (30, FIG. 8B) which stores list of mobile communication devices where 'mobile phone' application has been downloaded. If the server application determines the receiving mobile communication device is application naïve, the mobile communication device number (phone number) and the corresponding contact information requested to be sent are saved in a 'pending contact information' database the server 62, 23 (FIG. 8A). Thereafter, the server (60) application sends a message (short message service (SMS) or push notification) to the receiving mobile communication device (63); the message comprising of a user prompt and a link to the server (60) hosting the downloadable mobile phone application. In the current mobile architecture, push notification cannot be sent to application naïve mobile communication devices; hence at this step a SMS message is sent. SMS message can be sent either by SMS gateway or email gateway i.e. using the phone email address such as phone_number@wirelesscarrier,com. According to one method, the server application is programmed upon determining the receiving mobile communication device to be application naive to ask the user for wireless carrier ID at the time when phone number is entered after activation of the link/icon (23). Alternatively user may be asked to enter wireless carrier ID every time a request is sent from web page. The message prompts the user to download the mobile phone application into the mobile communication device from the server (64). The mobile phone application comprises of program code to extract unique mobile communication device ID (UDID) and/or device number (phone number) from internal memory of the mobile communication device; and transmit that data to the server (65). Additionally, the mobile phone application contains program code to send a successful download signal to the server (65) once the application is successfully downloaded into the mobile communication device (13). Using the mobile device number (phone number) as the identifying parameter, the server application may integrate the unique mobile device ID (UDID) with the corresponding mobile device number (phone number) and the corresponding pending contact information in the 'pending contact information' database (66, 23, FIG. 8A). Additionally, the server application may save the mobile communication device ID (UDID) and corresponding mobile communication device number (phone number) into the 'application experienced mobile communication devices' database 30 (FIG. 8B) in the server. The 'application experienced mobile communication devices' database 30 (FIG. 8B) contains a list of mobile communication devices where mobile phone application has been successfully downloaded. Once the server application receives confirmation of download of mobile phone application in the receiving mobile communication device (13); the server application may send the corresponding pending contact information in the 'pending contact information' database (23, FIG. 8A) to the mobile communication device (13) such as by SMS or by push notification (67) or other suitable transmission.

Figure 7:
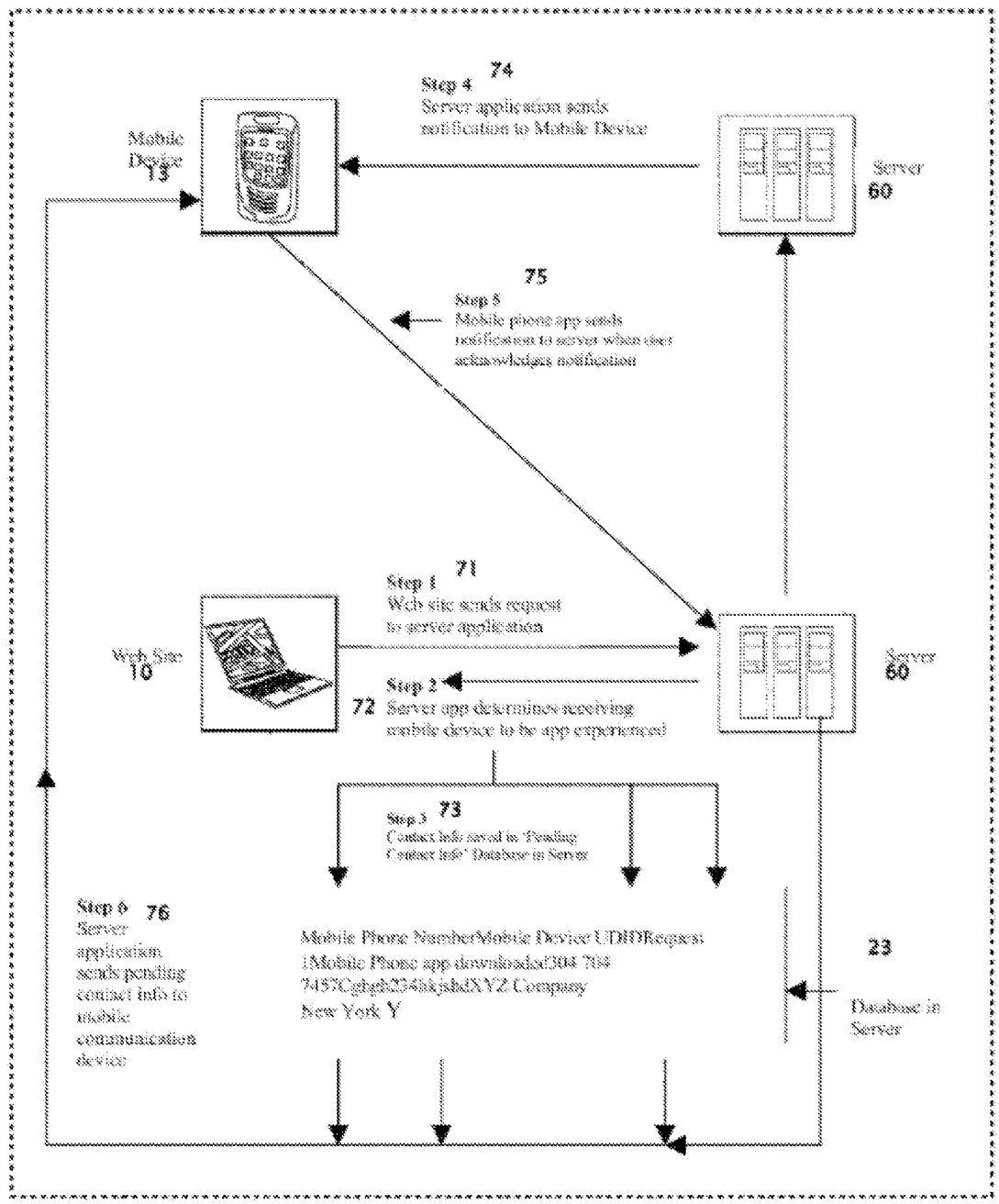
FIG. 7 shows a schematic diagram of the process of sending contact information from web page to an application experienced mobile communication device.

Now turning our attention to FIG. 7, if upon receiving request from web page (71), server application determines from 'application experienced mobile communication devices' database (30, FIG. 8B) that the receiving mobile communication device is application experienced (72); server application sends a message (such as by push notification or SMS) to the receiving mobile communication device via a push notification server/SMS server (74); and at the same time saves the request in the 'pending contact information' database (73, 23, FIG. 8A). When the push notification/SMS is accepted by the user, the mobile phone application is launched on the mobile communication device, where after the mobile phone application pulls contact information destined for corresponding mobile communication device from the server (75, 76). The mobile phone application then integrates and saves contact information into the contact list of the mobile communication device. Preferably server application contains program code to determine the wireless carrier and operating system of the receiving mobile communication device prior to initiating communication with the mobile communication device. Most wireless carriers require users to download mobile phone application from their native server. According to one embodiment, in such a situation, the wireless carrier server contains program code to communicate unique mobile communication device ID (such as the UDID) and mobile communication device number (phone number; which it receives upon download of mobile phone application into the mobile communication device) to the server at pre determined intervals or after preselected occurrences, or at other desired instances. It is hoped that in a future open environment, the mobile phone application will be downloaded into mobile communication devices directly from the server. For the sake of simplicity, the term server used in the application should be considered to encompass all servers; including wireless carrier server. It is also preferred that the mobile phone application extracts and communicates unique mobile communication device ID (UDID) to server at each instance of communication with server.

The server application may contain program code (instructions) to capture each instance of download of contact information from server into mobile communication devices. The server application saves these instances of download of contact information into a 'contact information experienced mobile communication devices' database in the user account corresponding to contact information; as shown in FIG. 8C. In an alternate embodiment mobile phone application contains program code to ping the server application with mobile communication device ID (UDID), mobile communication device number (phone number) and contact information ID, where after the server application saves the dataset into the 'contact information experienced mobile communication devices' database (FIG. 8C). The 'contact information experienced mobile communication devices' database is useful to businesses that want to send a targeted ad campaign to users who have already downloaded their contact information into their mobile communication devices. Such as ad campaign may be SMS or multimedia messaging service (MMS) based; and may contain one or combination of text, image, video and audio files.

The mobile phone application may contain program code that records instances of contact information retrieval and activation from within the contact list of the corresponding mobile communication device. Instances of contact information activation may include—making a phone call, opening email client/URL within the contact information, etc. The mobile phone application may contain program code to communicate at least one of i) instances of contact information retrieval and activation; ii) unique mobile communication device ID (UDID); iii) contact information ID; and/or iv) mobile communication device number (phone number) to the server at pre determined intervals. The server application saves all instances of contact information activation from mobile devices into 'contact information activation' database in the user account corresponding to the activated contact information in the server; as shown in FIG. 8F. Similarly, the server application saves all instances of contact information retrieval from mobile devices into 'contact information retrieval' database in the user account corresponding to the retrieved contact information in the server; as shown in FIG. 8D. This data reflects use of contact information sent from web page to mobile communication devices by end user. One or more reports may be generated from the data contained in the 'contact information activation' and 'contact information retrieval' databases. According to one preferred report, activation and retrieval data for each contact information is ranked according to total instances of activation and retrieval on all mobile communication devices where said contact information is saved. The 'contact information activation' and 'contact information retrieval' database is useful to businesses that want to send a targeted ad campaign to mobile communication device users who have downloaded and activated/retrieved their contact information in their mobile communication devices. Such as ad campaign may be SMS or MMS based; and may contain one or combination of text, image, video and audio files.

When a contact information is updated in the server, a message (push notification, SMS, or other desirable means) is sent to all mobile communication devices where said contact information is saved; using data contained in the 'contact information experienced mobile communication devices' database as shown in FIG. 8C. Once the message (push notification or SMS) is accepted by the user, the mobile phone application is launched on the mobile communication device, where after the mobile phone application downloads the updated version of the contact information from the server. The mobile phone application then replaces the older version of the contact information with the updated version in the contact list of the mobile communication device.

When a updated version of the mobile phone application is available in the server, a message (push notification/SMS) is sent to all mobile communication devices where said contact information is saved; using data contained in the 'application experienced mobile communication devices' database (FIG. 8B). Once the message (push notification or SMS) is accepted by the user, the mobile phone application is launched on the mobile communication device, where after the mobile phone application downloads the updated version of the mobile phone application from the server. The updated version of the mobile phone application then replaces the older version in the mobile communication device.

Means may be provided in the mobile communication device to execute meaningful applications based on the contact information contained in the 'contact list'. One example of such meaningful application is auto dialing of a phone number contained in contact information. Another example of such meaningful application is to establish connection to a web page URL contained in contact information without requiring the caller to type the said URL into a web browser on his/her communication device.

In addition to data, means is provided to attach voice, images and video files to the 'web contact information template'. This can be done using existing programming tools and formats such as windows media audio for voice; jpg, gif or tiff for images; and windows media & real for video. The software used to create an advertisement should not be considered limiting as other available software can also be used to create an advertisement. This feature of the invention can be used to advertise products and services of businesses in conjunction with contact information published on web sites. For example, an advertisement comprising of data, voice and/or video files can be attached to contact information in the 'web contact information template' published in a web page. When the said contact information is sent to a communication device, the advertisement attached thereto is also sent. Means is provided in the mobile communication device to save and/or display the said advertisement. The said advertisement is displayed when a caller selects or uses the corresponding contact information; as for example when auto dialing a phone number contained therein.

Figure 4A:
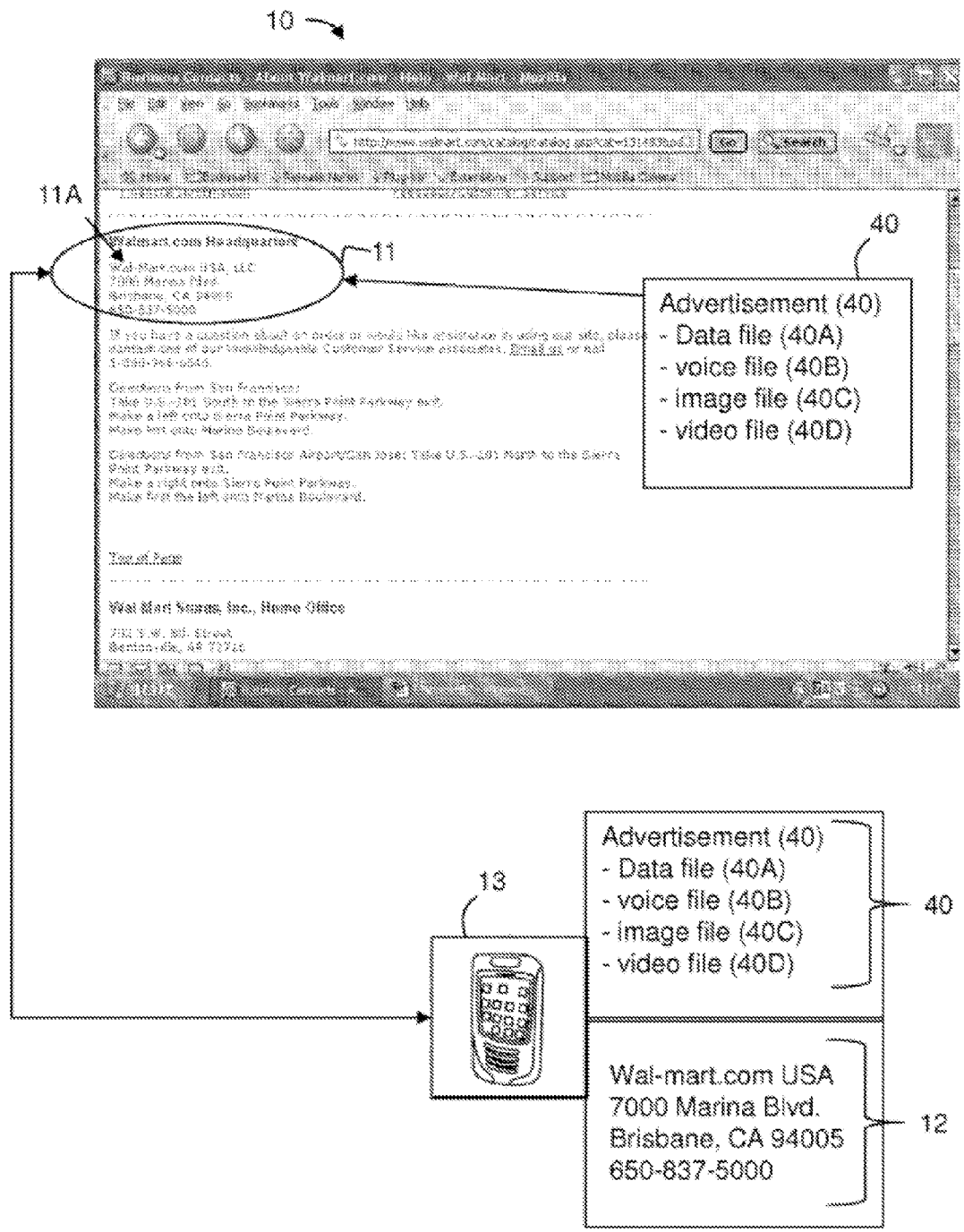
FIG. 4A shows the method of attaching an advertisement (40) containing one or more of data (40A), voice (40B), image (40C) and/or video (40D) files to the contact information (11A) published on a web page and thereafter sending the said contact information (11A) along with the attached advertisement (40) to a mobile communication device (13).

According to one method of the invention; advertisement containing data, voice, image and/or video files is attached to contact information published in a web page at the point of publication of the said contact information. The said advertisement is sent to a mobile communication device when the corresponding contact information is. Means is provided in the mobile communication device to save and/or display the said advertisement. The said advertisement is displayed when the caller selects or uses the said contact information such said when auto dialing a phone number contained therein. Means is provided to update advertisements already saved in a mobile communication device as a result. When contact information with an attached advertisement is transmitted to a communication device, the identity of the said mobile communication device is saved at a central location, such as a server. A new or revised version of the said advertisement is created and sent to all such communication devices where the said contact information has been previously saved. Appropriate software is provided in the communication devices to integrate the new or revised advertisement with the corresponding contact information saved therein. Such software can either be pre loaded into the communication devices or can be sent to communication devices separately, such as when the new or revised advertisement is sent. This feature, for example, can be used to send a new version an advertisement to communication devices having a particular contact information saved in their contact list. An example of this method is shown in FIG. 4A. Contact information of 'Wal-Mart' (11A) is published on its web page (10) using the 'web contact information template' (11). The contact information (11A has an advertisement (40) containing data (40A), voice (40B), image (40C) and video (40D) files attached to it. The said advertisement (40) contains brief information about Wal-Mart's promotional offers. When a user sends Wal-Mart's contact information (11A) from Wal-Mart's web page (10) to his mobile communication device such as mobile communication device (13), the advertisement (40) attached to Wal-Mart's contact information (11A) is also sent to the said mobile communication device (13). Both, the contact information (11A) and the attached advertisement (40) is integrated and saved in the said communication device. Furthermore, when a caller selects or uses Wal-Mart's contact information (11A), as for example when auto dialing Wal-Mart's phone number on his mobile communication device (13); the attached Wal-Mart's advertisement (40) is displayed on the said mobile communication device (13).

Figure 4B:
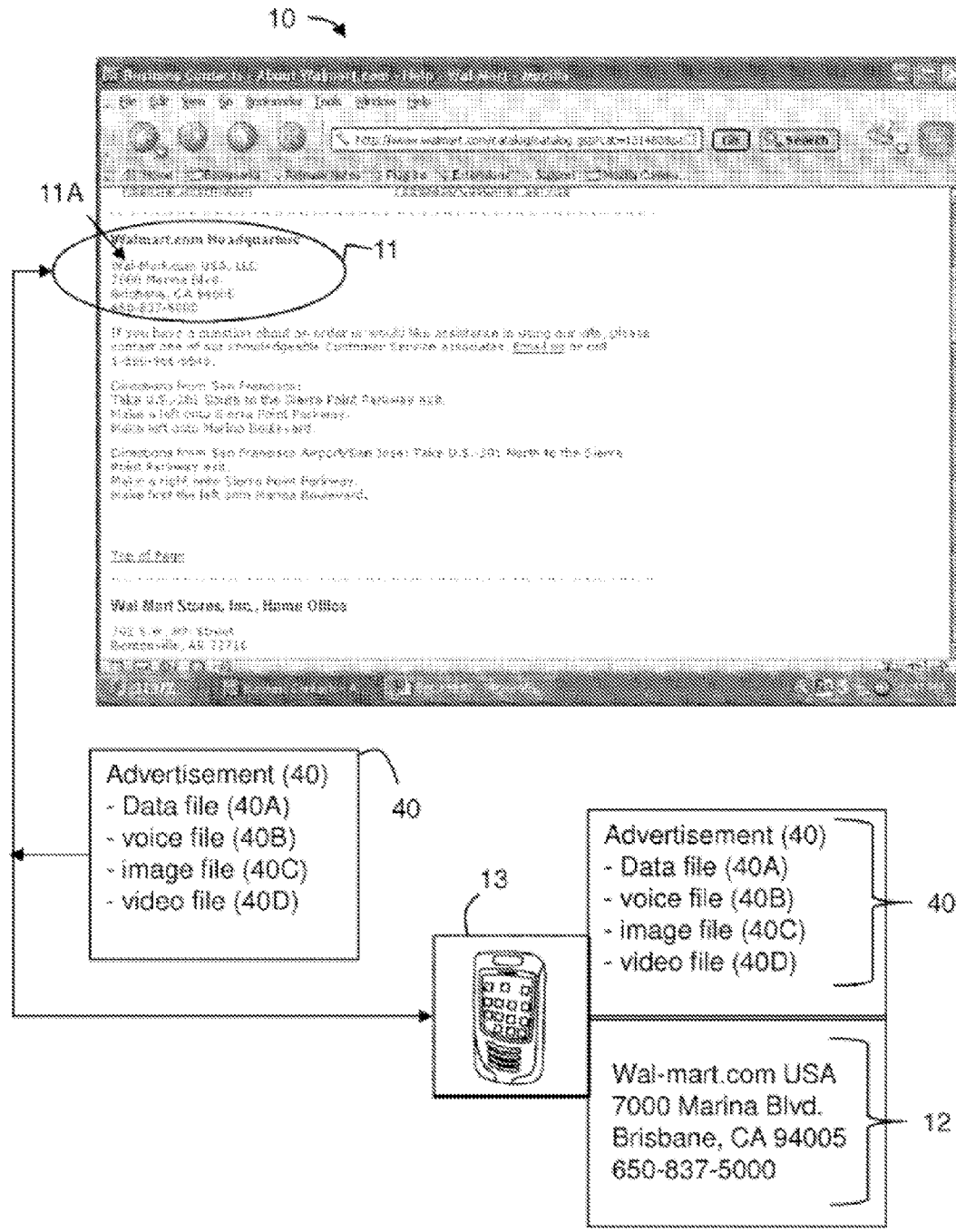
FIG. 4B shows the method of attaching an advertisement (40) containing one or more of data (40A), voice (40B), image (40C) and/or video (40D) files to a contact information (11A) published on a web page where the attachment of the advertisement (40) takes place while the corresponding contact information (11A) is in transit to a receiving mobile communication device (13).

According to another embodiment of a method, advertisements comprising of data, voice, image and/or video files is attached to contact information while the said contact information is in transit to a communication device. This method enables more customization of the advertisement that is sent to a communication device. For example, an advertiser can attach golf advertisements to a contact information in transit to the mobile communication device of a caller who is a golf player; and attach tennis advertisements when the said contact information is in transit to a caller who is a tennis player. An example of this method is shown in FIG. 4B. Contact information of 'Wal-Mart' (11A) is published on its web page (10) using the 'web contact information template' (11). An advertisement (40) containing data (40A), voice (40B), image (40C) and video (40D) files contains brief information about Wal-Mart's promotional offers. When a user sends Wal-Mart's contact information (11A) from Wal-Mart's web page (10) to his mobile communication device such as mobile communication device (13), the advertisement (40) is attached to Wal-Mart's contact information (11A) while the said contact information (11A) is in transit to the mobile communication device (13). The advertisement (40) is then sent to the mobile communication device (13) along with the contact information (11A). Both, the contact information (11A) and the attached advertisement (40) is integrated and saved in the said mobile communication device (13). Furthermore, when a caller selects or uses Wal-Mart's contact information (11A); as for example when auto dialing Wal-Mart's phone number; on his mobile communication device (13); the attached Wal-Mart's advertisement (40) is displayed on the mobile communication device (13).

According to yet another method, a package of advertisements comprising of data, voice, image and/or video files are pre-loaded or downloaded into the communication devices. Said communication devices are programmed to play selected advertisements when a caller selects/uses selected contact information or selected category of contact information saved in the communication device. Alternatively, an .exe type file can be attached to the contact information contained in the 'web contact information template';

wherein the said .exe type file has means to program a mobile communication device to play select advertisements or category of advertisements saved therein; when a caller selects/uses the said contact information or selected category of contact information. Means is provided to change and update the association between an advertisement and contact information. For example, a package of multiple advertisements containing an advertisement of Dell Computers is pre-loaded or downloaded into a communication device. When a caller saves the contact information of Dell Computers in the said communication device, it is programmed to display Dell Computers' advertisement when the contact information of Dell Computers is selected/used by the caller. Alternatively, the mobile communication device can be programmed to display Dell's advertisement when the caller selects a different contact information.

These methods of advertisement of the present invention serve as a powerful means of targeted advertising; as the product and services is advertised to a select and targeted customer base. In the illustrated examples shown in FIGS. 4A and 4B, promotional offers (40) of Wal-Mart are advertised only to customers who have willingly saved Wal-Mart's contact information (11A) in their communication devices (13). Additionally; promotional offers (40) at Wal-Mart is advertised to the said customer at the time when he/she is selects/uses the contact information of Wal-Mart (11A); such as when auto dialing a phone number contained therein. These features combined, in inventor's opinion, will result in a significantly higher sales and revenue for businesses.

Figure 9A:
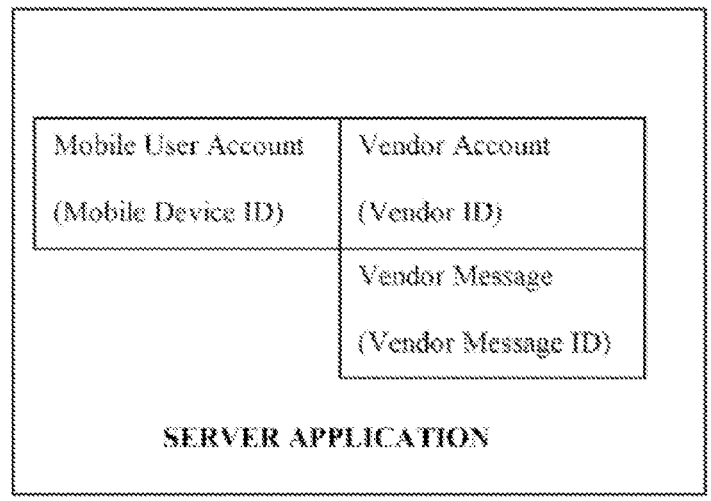
FIGS. 9A-B show schematic representation of messaging between a vendor and a mobile communication device (mobile user).
Figure 9B:
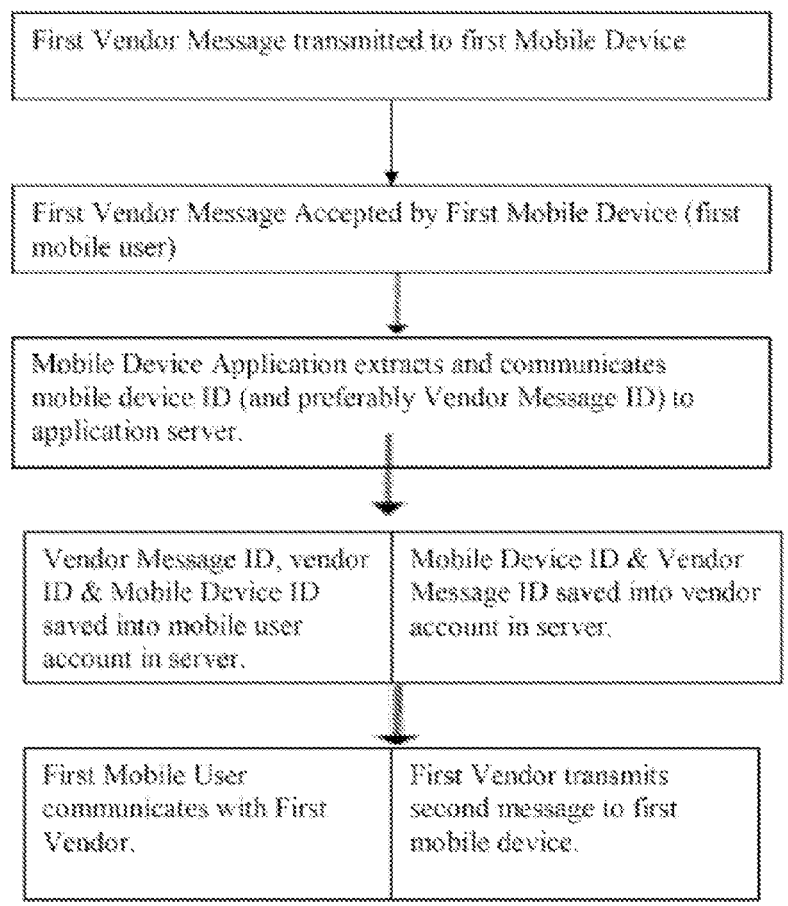

According to another aspect of the invention; as shown in FIGS. 9A & 9B; one or more vendors create an vendor account (having a unique vendor ID) in the server application where each such vendor inputs one or more vendor messages into the corresponding vendor account. The server application assigns each vendor message with a unique ID that ties each vendor message to the corresponding vendor ID. The vendor message may be in the form of text, image, audio, and video and may comprise of an offer, sale, coupon, advertisement, notification etc. The nature and format of the message should not be considered limiting. When the mobile application is downloaded into the mobile phone, it extracts the mobile device ID from within the internal memory of the mobile device or alternatively by means of manual input of the mobile device ID by the mobile user; and communicates it to the server application. The mobile device ID can be the unique device ID (UDID), the mobile phone number and the like; and as such the nature of the mobile device ID should not be considered limiting. The server application creates a mobile user account corresponding to the mobile device ID. Alternatively, the mobile user account is created in the server application in a 'cloud environment" on the application server itself. In this method; the mobile user enters the mobile device ID into the corresponding mobile user account in the server application. Mobile user instructs server application user's acceptance to receive vendor messages from server. Thereafter server application transmits one or more vendor messages to the corresponding mobile device. Preferably, transmission of second message from a vendor is contingent upon acceptance of the first message from the corresponding vendor by the mobile user on the mobile device. An advantage of this method is that it obviates the need for a mobile application to reside on the phone for the purpose of creating a mobile user account in the application server. The server application communicates one or more vendor messages to the mobile device. Mobile user has an option to accept or reject the vendor message. When mobile user accepts a vendor message; the mobile device ID (and preferably the vendor message ID) is communicated to the server application. The server application then logs the accepted vendor message ID and the corresponding vendor ID into the mobile user account in the application server; and server application also logs the mobile device ID and vendor message ID into corresponding vendor's account.

According to one aspect of the invention; means is provided to enable a vendor to communicate one or more vendor messages to one or more mobile users who have accepted a previous vendor message from the corresponding vendor. Example, Pete's Pizza Store is able to send a discount offer to all mobile users who have previously accepted a discount offer from Pete's Pizza Store. According to another aspect of the invention, means is provided to enable a vendor to communicate one or more vendor messages to one or more mobile users who have accepted a previous vendor message from a related vendor. Example, Pete's Pizza Store is able to send a discount offer to all mobile users who have previously accepted a discount offer from John's Pizza Store. According to another aspect; means is provided to enable mobile user to communicate with one or more vendors; from who the mobile user has accepted one or more previous offers.

The invention is capable of other embodiments and of being practiced and carried out in various ways. As such, those skilled in the art will appreciate that the conception, upon which this disclosure is based, may readily be utilized as a basis for the designing of other structures, methods and systems for carrying out one or several purposes of the present invention. It is important, therefore, that the claims be regarded as including such equivalent constructions insofar as they do not depart from the spirit and scope of the present invention. Some variations of the present inventions are: 1) Although the present invention relates to transmission of contact information from a web page to communication devices; contact information from other sources like MS Outlook, Palm address book and the like can also be sent to one or more communication devices. 2) The present invention relates to methods and means of sending contact information published in a web page to communication devices. However, contact information published on a web page can also be sent to contact management programs such as MS Outlook. 3) In addition to contact information, other types of information can be sent to communication devices similarly. For example, means and methods of the present invention can be used to send data, image, voice and video files published on a web page to one or more communication devices. As shown in FIG. 5; data (51) published on a web page (10) can be sent to a mobile communication device (13) using the principles of the invention. 4) Based on the recitals of the present invention, the means and method described can be used to send data, voice, image and video published in an offline source, such as MS Word, to one or more communication devices. In the above mentioned variations of the present invention, preferably means are provided to save, archive and organize the said files in the communication device. Preferably, a reader and a viewer program are provided to enable optimal display of the contents of the said files in communication devices.

The preceding description has been presented only to illustrate and describe exemplary embodiments of the methods and systems of the present invention. It is not intended to be exhaustive or to limit the invention to any precise form disclosed. It will be understood by those skilled in the art that various changes may be made and equivalents may be substituted for elements thereof without departing from the scope of the invention. In addition, many modifications may be made to adapt a particular situation or material to the teachings of the invention without departing from the essential scope. Therefore, it is intended that the invention not be limited to the particular embodiment disclosed as the best mode contemplated for carrying out this invention, but that the invention will include all embodiments falling within the scope of the claims. The invention may be practiced otherwise than is specifically explained and illustrated without departing from its spirit or scope. The scope of the invention is limited solely by the following claims.

What is claimed is:

1. A method, performed by a server running a software server application, for sending messages from vendors to respective mobile communication addresses of mobile users, the server application having access to a plurality of mobile user accounts each identifying a respective mobile user and including address identification information identifying a communication address of the respective mobile user, the plurality of mobile user accounts containing a first mobile user account including first address identification information identifying a first communication address of a first mobile user, the server application having access to a plurality of vendor accounts each including vendor identification information identifying a respective vendor and a plurality of vendor messages of the respective vendor, the plurality of vendor accounts containing a first vendor account including first vendor identification information identifying a first vendor and a plurality of vendor messages of the first vendor, the plurality of vendor accounts further containing a second vendor account including second vendor identification information identifying a second vendor and a plurality of vendor messages of the second vendor, the method comprising:

sending, by the server application through the server, a first vendor message of the plurality of vendor messages of the first vendor to the first communication address of the first mobile user;

receiving, by the server application through the server, from the first communication address of the first mobile user, acceptance information indicating the first mobile user's acceptance of the first vendor message of the first vendor;

verifying, by the server application through the server, from the received acceptance information that the first mobile user has accepted the first vendor message of the vendor; and sending, by the server application through the server, a first vendor message of the plurality of vendor messages of the second vendor, to the first communication address of the first mobile user only after the verifying of the first mobile user having accepted the first vendor message of the first vendor.

2. The method of claim 1, wherein the sending of the first vendor message of the first vendor to the first communication address of the first mobile user is only performed when the server application receives mobile-user-interest-indicating information indicating or otherwise suggesting that the first mobile user may be interested in products or services provided by the first vendor.

3. The method of claim 2, wherein the mobile-user-interest-indicating information received by the server application comprises information indicating that a mobile communication device of the first mobile user has downloaded or otherwise affirmatively acquired contact information of the first vendor.

4. The method of claim 1, wherein the first and second vendors are competitors competing in one same industry.

5. The method of claim 1, wherein for each of the plurality of vendor accounts, each of the plurality of vendor messages of the respective vendor comprises at least one of text, an audio, an image and a video.

6. The method of claim 1, wherein for each of the plurality of mobile user accounts, the communication address of the address identification information of the respective mobile user account comprises at least one of a unique device ID identifying a mobile communication device of the respective mobile user, a phone number assigned to a mobile communication device of the respective mobile user, and a messaging address of the respective mobile user.

7. A server for sending messages from vendors to respective communication addresses of mobile users, the server comprising:

one or more processors; and one or more system memories, said system memories storing a software server application, the server application having access to a plurality of mobile user accounts each identifying a respective mobile user and including address identification information identifying a communication address of the respective mobile user, the plurality of mobile user accounts containing a first mobile user account including first address identification information identifying a first communication address of a first mobile user, the server application having access to a plurality of vendor accounts each including vendor identification information identifying a respective vendor and a plurality of vendor messages of the respective vendor, the plurality of vendor accounts containing a first vendor account including first vendor identification information identifying a first vendor and a plurality of vendor messages of the first vendor, the plurality of vendor accounts further containing a second vendor account including second vendor identification information identifying a second vendor and a plurality of vendor messages of the second vendor, said server application adapted to perform, when executed by the one or more processors, a set of steps comprising:

sending a first vendor message of the plurality of vendor messages of the first vendor to the first communication address of the first mobile user;

receiving from the first communication address of the first mobile user, acceptance information indicating the first mobile user's acceptance of the first vendor message of the first vendor;

verifying from the received acceptance information that the first mobile user has accepted the first vendor message of the vendor; and sending a first vendor message of the plurality of vendor messages of the second vendor, to the first communication address of the first mobile user only after the verifying of the first mobile user having accepted the first vendor message of the first vendor.

8. The server of claim 7, wherein the sending of the first vendor message of the first vendor to the first communication address of the first mobile user is only performed when the server application receives mobile-user-interest-indicating information indicating or otherwise suggesting that the first mobile user may be interested in products or services provided by the first vendor.

9. The server of claim 8, wherein the mobile-user-interest-indicating information received by the server application comprises information indicating that a mobile communication device of the first mobile user has downloaded or otherwise affirmatively acquired contact information of the first vendor.

10. The server of claim 7, wherein the first and second vendors are competitors competing in one same industry.

11. The server of claim 7, wherein for each of the plurality of vendor accounts, each of the plurality of vendor messages of the respective vendor comprises at least one of text, an audio, an image and a video.

12. The server of claim 7, wherein for each of the plurality of mobile user accounts, the communication address of the address identification information of the respective mobile user account comprises at least one of a unique device ID identifying a mobile communication device of the respective mobile user, a phone number assigned to a mobile communication device of the respective mobile user, and a messaging address of the respective mobile user.

* * * * *